United States Patent
Ström et al.

(10) Patent No.: US 9,286,698 B2
(45) Date of Patent: Mar. 15, 2016

(54) METHOD AND DEVICE FOR STORING A COMPRESSION RATIO INDICATION IN A PIXEL VALUE BUFFER IN TILE ENCODING

(75) Inventors: Jacob Ström, Stockholm (SE); Per Wennersten, Arsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 252 days.

(21) Appl. No.: 13/993,842

(22) PCT Filed: Dec. 14, 2010

(86) PCT No.: PCT/SE2010/051380
§ 371 (c)(1),
(2), (4) Date: Nov. 26, 2013

(87) PCT Pub. No.: WO2012/082029
PCT Pub. Date: Jun. 21, 2012

(65) Prior Publication Data
US 2014/0177971 A1   Jun. 26, 2014

(51) Int. Cl.
*G06K 9/36* (2006.01)
*G06T 9/00* (2006.01)
*H04N 19/46* (2014.01)
*H04N 19/91* (2014.01)
*H04N 19/426* (2014.01)

(52) U.S. Cl.
CPC . *G06T 9/005* (2013.01); *G06T 9/00* (2013.01); *H04N 19/428* (2014.11); *H04N 19/46* (2014.11); *H04N 19/91* (2014.11)

(58) Field of Classification Search
USPC ............ 382/235, 243, 246, 307; 358/426.05, 358/426.08
See application file for complete search history.

(56) References Cited

U.S. PATENT DOCUMENTS

| | | | |
|---|---|---|---|
| 5,291,282 A | 3/1994 | Nakagawa et al. | |
| 5,953,488 A | 9/1999 | Seto | |
| 6,711,296 B1 | 3/2004 | Higuchi et al. | |
| 7,148,822 B2 * | 12/2006 | Suzuki | 341/67 |
| 7,218,834 B2 * | 5/2007 | Ono | H04N 5/76 360/15 |
| 7,292,731 B2 * | 11/2007 | Sekiguchi | H04N 19/56 375/240.24 |
| 7,433,825 B1 | 10/2008 | Sperschneider et al. | |
| 7,791,510 B2 * | 9/2010 | Maeda | 341/67 |
| 7,894,532 B2 * | 2/2011 | Otsuka | H04N 19/70 341/67 |
| 8,320,685 B2 * | 11/2012 | Ozaki | H04N 1/387 382/232 |
| 8,769,141 B2 * | 7/2014 | Melnyk et al. | 709/231 |
| 8,874,531 B2 * | 10/2014 | Sulieman et al. | 707/693 |
| 2009/0281425 A1 | 11/2009 | Sasahara et al. | |
| 2010/0073574 A1 | 3/2010 | Nakajima et al. | |

* cited by examiner

*Primary Examiner* — Yosef Kassa
(74) *Attorney, Agent, or Firm* — Rothwell, Figg, Ernst & Manbeck, P.C.

(57) ABSTRACT

A tile of pixels is encoded by variable length encoding blocks of pixels constituting different subsets of the tile to form sequences of symbols as encoded representations of the pixel values. A respective size indication is determined for each set of at least block. A size indication is representative of a compression ratio of a combined sequence corresponding to the at least one sequence of symbols obtained for the at least one block of the set. The combined sequences are arranged in a pixel value buffer in a buffer memory. The size indication determined for a given set is also stored in the pixel value buffer in the buffer memory to precede, according to a reading order of the pixel value buffer, the combined sequence of the given set.

20 Claims, 9 Drawing Sheets

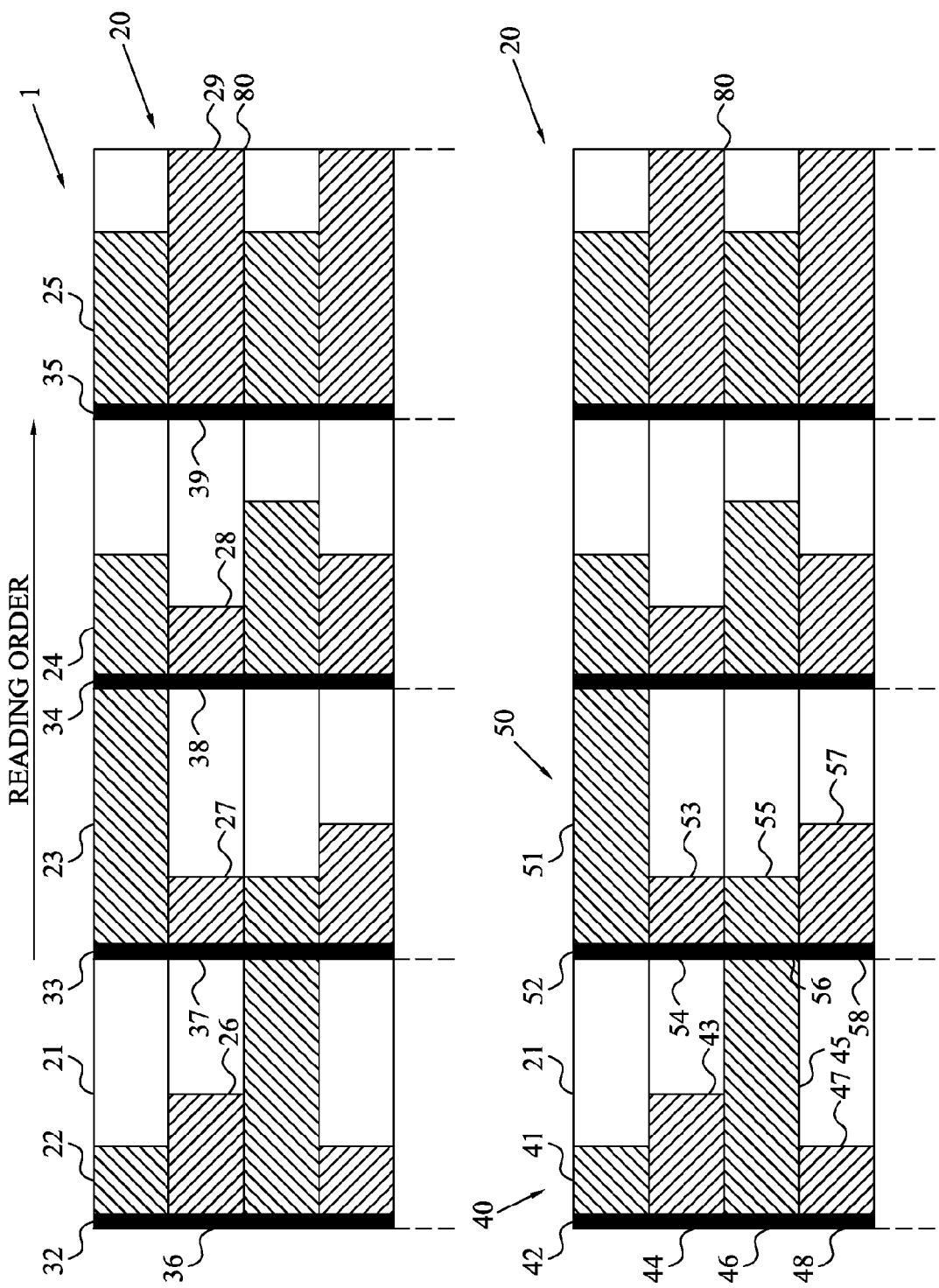

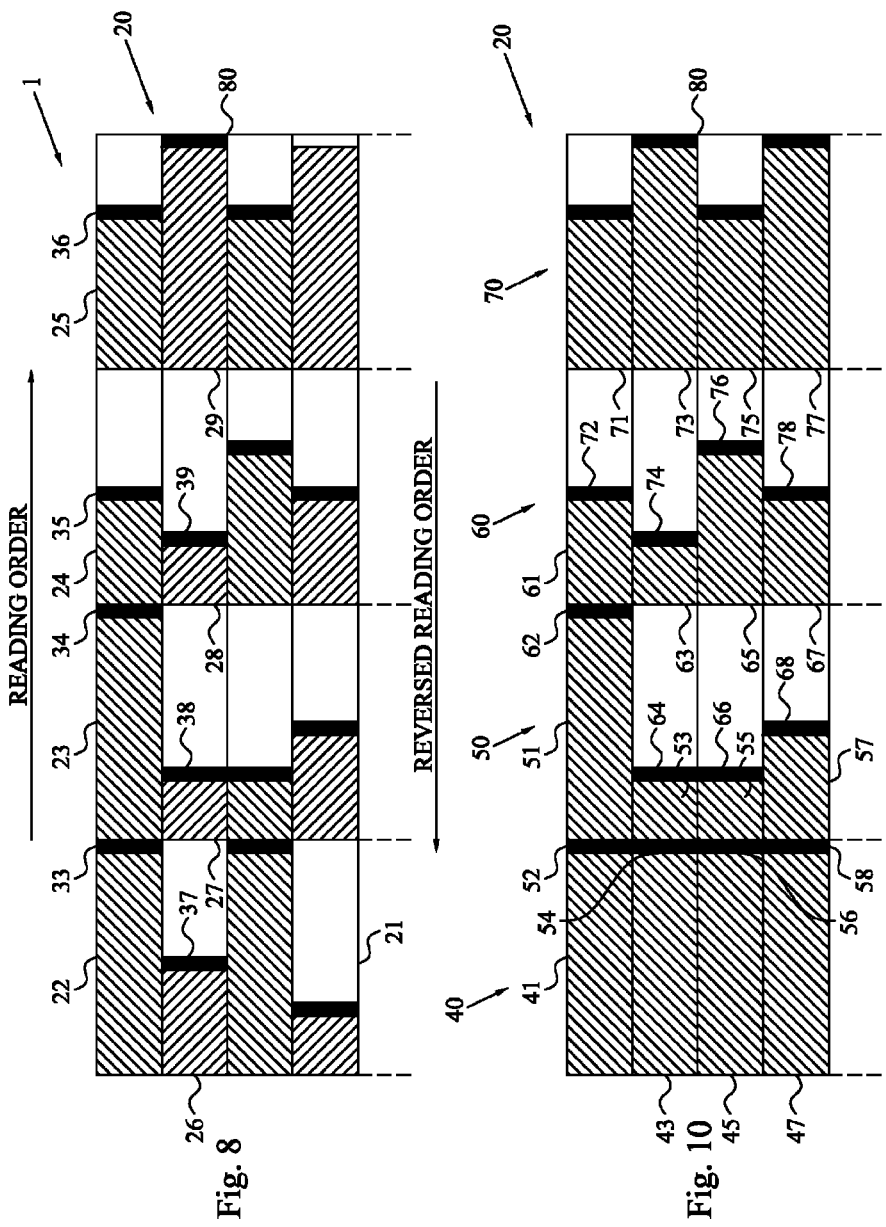

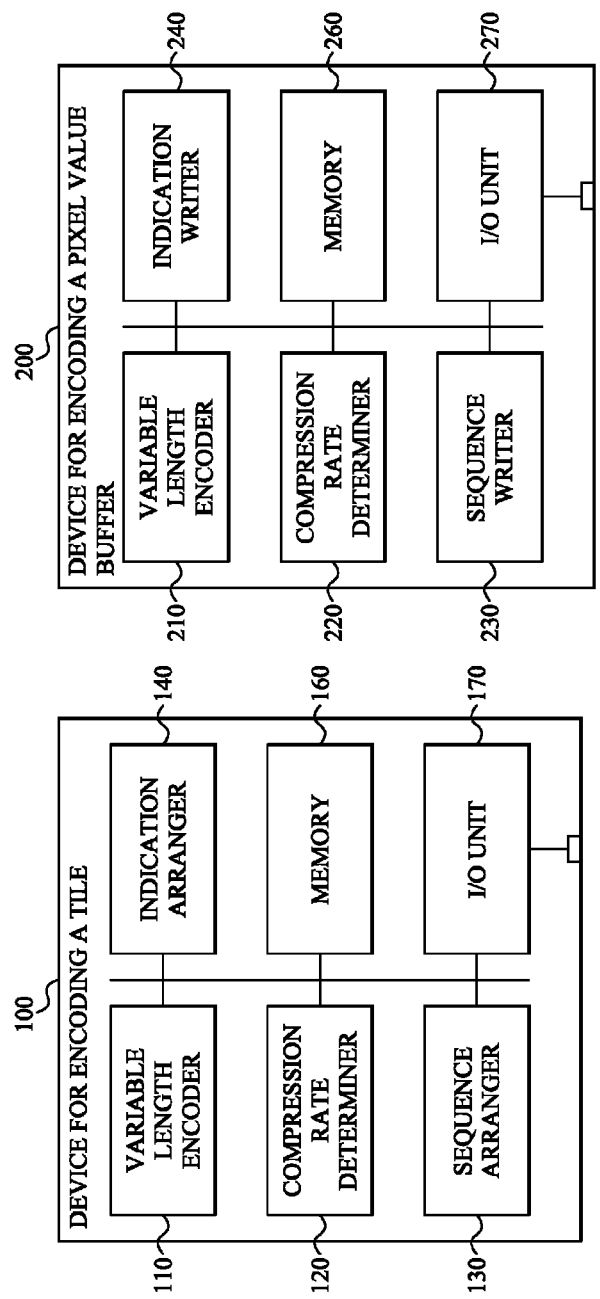

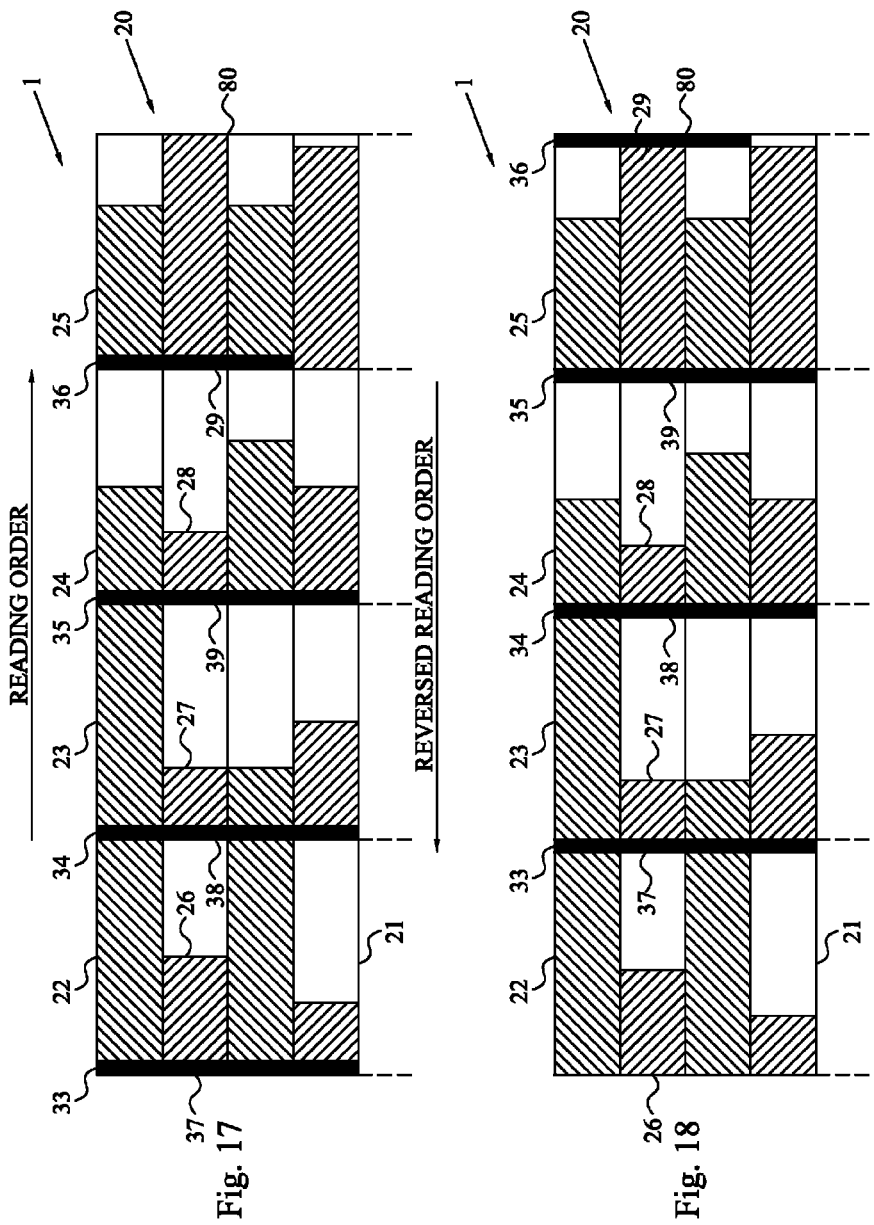

METHOD AND DEVICE FOR STORING A COMPRESSION RATIO INDICATION IN A PIXEL VALUE BUFFER IN TILE ENCODING

CROSS-REFERENCE TO RELATED APPLICATION(S)

This application is a 35 U.S.C. §371 National Phase Entry Application from PCT/SE2010/051380, filed Dec. 14, 2010, designating the United States, the disclosure of which is incorporated by reference herein in its entirety.

TECHNICAL FIELD

The present invention generally relates to image processing, and in particular to encoding of tiles for a pixel value buffer.

BACKGROUND

One of the bandwidth-consuming tasks in a computer graphics system is updating buffers, and in particular the color buffer. The color buffer contains the data that is finally going to be displayed, i.e. the output pixels. In a traditional architecture the color buffer is updated triangle by triangle. First the first triangle is rasterized, and the corresponding pixels of the color buffer are updated. Then the second triangle is rasterized, writing to its pixels in the color buffer, potentially overlapping with those of the first triangle. This means that each pixel in the color buffer can be written to several times. A typical application will overwrite every pixel in the color buffer perhaps three to ten times on average. This is known as having an overdraw of 3 to 10 within the technical field. This means that the write bandwidth for the color buffer will be between three and ten times as large as if each pixel was only written once.

One way to decrease the bandwidth requirements of the color buffer is to use what is known as a tiled architecture. Instead of rasterizing the scene triangle by triangle, the color buffer is divided into non-overlapping tiles. Then the scene is rendered tile by tile. For the first tile, only the triangles overlapping with the first tile are used for rasterization. The tile size is made small enough so that the entire tile can fit on-chip on the graphical processing unit (GPU). Hence no external memory accesses to the color buffer are needed during the rendering of the triangles of the tile. When all the triangles in the tile have been rasterized, the tile is sent to the color buffer memory and the next tile is processed. Note that in a tiled architecture, each pixel in the color buffer is only written once to external memory. This means that a tiled architecture can often decrease the write bandwidth for the color buffer with a factor of 3-10.

Another technique to lower color buffer bandwidth is called buffer compression. This means that blocks of buffer data are stored in memory in compressed form. The scene is still processed triangle-by-triangle, but before sending a block of pixels to the color buffer memory, the pixels are compressed. A few bits called size bits stored or cached in the GPU are used to keep track of how well the data was compressed, for instance compressed down to a bit length corresponding to 25%, 50% or 75% of the original bit length or not compressed at all. When a subsequent triangle wants to write to the same block of pixels, the size bits are used to know how much data should be read. The block is decompressed, the new triangle overwrites some of the pixels in the block, and the block is then again compressed and stored. Hasselgren and Akenine-Möller, 2006, Efficient Depth Buffer Compression, In Graphics Hardware, 103-110 and Rasmusson, Hasselgren and Akenine-Möller, 2007, Exact and Error-bounded Approximate Color Buffer Compression and Decompression, In Graphics Hardware, 41-48 give good overviews of color buffer compression and depth buffer compression respectively.

A limitation with the tiled architecture is that, although each pixel is only written once, this is still quite expensive. Furthermore, the display controller will have to read each pixel to output it to the display. This means that each pixel will have to be read from the color buffer and written to the color buffer at least once in uncompressed form, which is expensive.

A problem with the color buffer compression solution is that, even if it is possible to achieve a compression factor of 50%, it is still too much bandwidth. With an overdraw of, for instance, 6, every pixel is still written six times on average. A compression ratio of 50% will bring down the effective bandwidth to 3 times the number of pixels, but that is still more than for the tiled architecture.

There is therefore a need for a technique that can efficiently handle pixel value buffers in connection with a computer graphics system.

SUMMARY

It is a general objective to efficiently handle pixel value buffers in connection with a computer graphics system.

This and other objectives are met by embodiments as disclosed herein.

An aspect of the embodiments defines a method of encoding a tile of pixels each having a respective pixel value. The method comprises variable length encoding multiple blocks of pixels constituting respective subsets of the tile. The variable length encoding generates multiple sequences of symbols as encoded representations of the pixel values of the pixels in the multiple blocks. A size indication is determined for each set of at least one block in the tile. The size indication is representative of the compression ratio of a combined sequence generated for the set. The combined sequence then corresponds to the at least one sequence of symbols obtained by variable length encoding the at least one block of the set. The combined sequences are arranged in a pixel value buffer in a buffer memory. The size indications determined for the sets are also arranged in the pixel value buffer in the buffer memory so that the size indication determined for a set precedes the combined sequence of the set according to a reading order of the pixel value buffer.

Another aspect of the embodiments relates to a device for encoding a tile of pixels. The device comprises a variable length encoder configured to variable length encode multiple blocks of pixels in the tile to form multiple sequences of symbols as encoded representations of the pixel values of the pixels in the multiple blocks. A compression rate determiner determines a respective size indication for each set of at least one block of the multiple blocks. A size indication is a representation of the compression ratio of a combined sequence corresponding to the at least one sequence of symbols obtained from the variable length encoder for the at least one block of the set. The device also comprises a sequence arranger configured to arrange the combined sequences in a pixel value buffer in a buffer memory. An indication arranger arranges the size indications determined for the sets in the pixel value buffer in the buffer memory. The indication arranger in particular arranges the size indication of a set to precede the combined sequence of the set according to a reading order of the pixel value buffer.

A further aspect of the embodiments relates to a method of encoding a pixel value buffer comprising multiple tiles of pixels. The method comprises variable length encoding multiple blocks of pixels for each tile of at least a portion of the multiple tiles in the pixel value buffer. The multiple blocks constitute respective subsets of the tile. The variable length encoding generates multiple sequences of symbols as encoded representations of the pixel values of the pixels in the multiple blocks. A size indication is determined for each set of multiple blocks in each tile of the at least a portion of the multiple tiles. A size indication is a representation of a compression ratio of a combined sequence corresponding to the multiple sequences of symbols obtained by variable length encoding the multiple blocks of a set. The combined sequences for the at least a portion of the multiple tiles are written to the pixel value buffer in a buffer memory. These combined sequences are further written to the pixel value buffer according to a reversed order that is selected from a reversed Morton order, a reversed Hilbert order and an order that is opposite to the reading order of the pixel value buffer. The size indications determined for the at least a portion of the multiple tiles are also written to the pixel value buffer in the buffer memory. The size indications for a tile are written to the pixel value buffer in the buffer memory in connection with preceding combined sequences. These preceding combined sequences belong to a preceding tile preceding the tile according to the reading order of the pixel value buffer.

Yet another aspect relates to a device for encoding a pixel value buffer comprising multiple tiles of pixels. The device comprises a variable length encoder configured to variable length encode multiple blocks of pixels for each tile of at least a portion of the multiple tiles in the pixel value buffer. The multiple blocks constitute respective subsets of the tile. The variable length encoder thereby outputs multiple sequences of symbols per tile as encoded representations of the pixel values of the pixels in the multiple blocks in the tile. A compression rate determiner determines a size indication for each set of multiple blocks in each tile of the at least a portion of the multiple tiles. A size indication is representative of a compression ratio of a combined sequence corresponding to multiple sequences of symbols obtained from the variable length encoder for the multiple blocks of the set. The device also comprises a sequence writer for writing the combined sequences to the pixel value buffer in a buffer memory according to a reversed order selected from a reversed Morton order, a reversed Hilbert order and an order that is opposite to a reading order of the pixel value buffer. An indication writer is configured to write the size indications determined for a tile of the at least a portion of the multiple tiles to the pixel value buffer in the buffer memory. The indication writer furthermore writes the size indications of a tile in connection with preceding combined sequences of a preceding tile preceding the current tile according to the reading order in the pixel value buffer.

The encoding of tiles will reduce the bandwidth requirements when writing the tiles to the pixel value buffer in the buffer memory. The buffer memory will further comprise both the combined sequences and the size indications required in order to identify the respective lengths of the combined sequences in the buffer memory. The particular arrangement of the size indications to precede the respective associated combined sequence in the pixel value buffer in the buffer memory implies that when reading the pixel value buffer in the reading order the size indication is read prior to reading the combined sequence to which the read size indication applies. The retrieval of data from the pixel value buffer prior decoding of the data is therefore conducted in an efficient way with low latency.

BRIEF DESCRIPTION OF THE DRAWINGS

The invention, together with further objects and advantages thereof, may best be understood by making reference to the following description taken together with the accompanying drawings, in which:

FIG. 3 is a schematic illustration of a portion of a pixel value buffer in a buffer memory according to an embodiment;

FIG. 4 is a schematic illustration of a portion of a pixel value buffer in a buffer memory according to another embodiment;

FIG. 8 is a schematic illustration of a portion of a pixel value buffer in a buffer memory according to a further embodiment;

FIG. 10 is a schematic illustration of a portion of a pixel value buffer in a buffer memory according to yet another embodiment;

FIG. 14 is a schematic block diagram of a device for encoding a tile according to an embodiment;

FIG. 15 is a schematic block diagram of a device for encoding a pixel value according to an embodiment;

FIG. 17 is a schematic illustration of a portion of a pixel value buffer in a buffer memory according to another embodiment; and FIG. 18 is a schematic illustration of a portion of a pixel value buffer in a buffer memory according to yet another embodiment.

DETAILED DESCRIPTION

Figure 5:
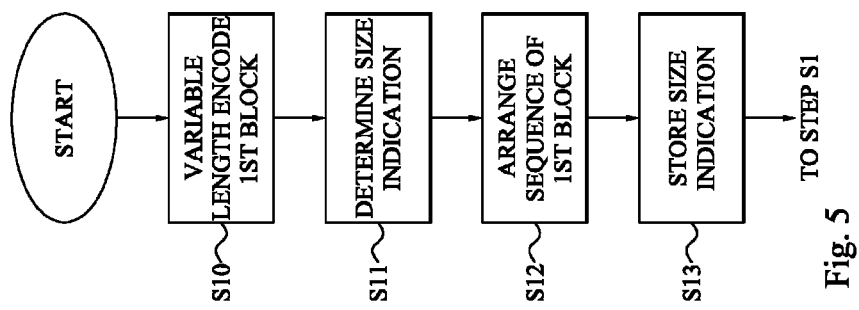
FIG. 5 is a flow diagram illustrating additional, optional steps of the method in FIG. 1.

Throughout the drawings, the same reference numbers are used for similar or corresponding elements.

The embodiments generally relate to image processing and in particular to encoding of tiles of pixels constituting at least a portion of a pixel value buffer. The embodiments thereby combine the prior art techniques for buffer compression with tiled architecture to even further reduce the write bandwidth when writing to and updating a pixel value buffer in a buffer memory. The encoding of the tile is further conducted in a particular way that reduces the need for external memory accesses and information requests.

According to the embodiments, a tile of pixels represents at least a portion of the pixel value buffer. Hence, the pixel value buffer is divided into one or, typically multiple, i.e. at least two, non-overlapping portions that are denoted tiles in the art. It could be possible, in particular for very small pixel value buffers, that a single tile occupies the whole pixel value buffer. However, in most practical implementations the pixel value buffer is regarded as being divided into separate non-overlapping tiles.

However, encoding a whole tile is generally not feasible due to long encoding and decoding times and reduced encoding efficiency. Hence, it is desired to divide a tile into multiple blocks of pixels, where the size of such a block in terms of the number of pixels is selected to be efficiently handled from encoding and decoding point of view. Each such block is then individually variable length encoded to generate a sequence of symbols.

The variable length encoding implies that the sequences of symbols obtained from the encoding do not have a single fixed symbol length but rather can adopt various symbol lengths. Additional information in terms of size indications are required in order to identify respective encoded sequences of symbols. The embodiments provide efficient solutions to handle these size indications.

According to the embodiments, each pixel has a respective pixel value. Various such pixel values are used in the art, depending on the particular application. A typical example of such a pixel value is a color value, and more preferably a multi-component color value. In the latter case, the pixel color consists of multiple color components. A typical example of such a color is a red, green, blue (RGB) color having three color components. Other multi-component colors, such as YUV, YCoCg or YCrCb, are also known in the art and can be used according to the embodiments.

Another example of pixel value that can be used according to the embodiments is a depth value or so-called Z value. This feature represents the depth or distance to the eye for the particular pixel and controls which pixels that will actually be displayed during rendering.

The tile could then constitute at least a portion of a color buffer or a depth buffer.

Another example of a pixel value buffer, besides color and depth buffer, to which the embodiments can be applied, is a so-called stencil buffer. The stencil buffer can be used to limit the area of rendering, also denoted stencilling in the art. The stencil buffer can also be used in connection with the depth buffer in the rendering pipeline. For instance, stencil values can be automatically updated, i.e. increased or decreased, for every pixel that fails or passes the depth test. The stencil buffers find applications in achieving various effects, such as shadows, outline drawing or highlighting of intersections between complex primitives. In such a case, the tile could constitute at least a portion of a stencil buffer and the pixel value is a stencil value of the stencil buffer.

Figure 1:
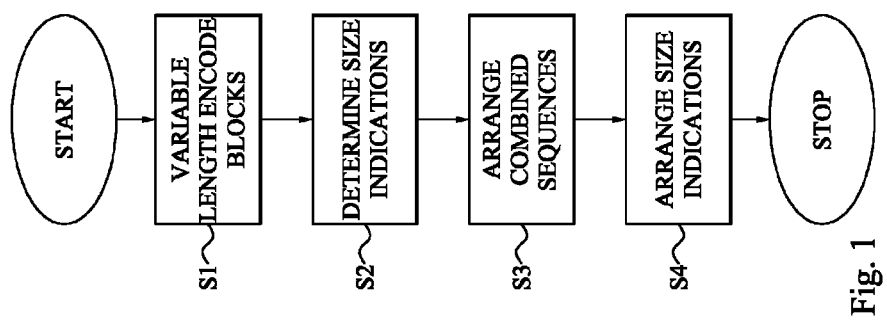
FIG. 1 is a flow diagram illustrating a method of encoding a tile according to an embodiment.

Actually, the pixel value could be any property that is desired to be assigned on pixel basis and where pixels are grouped into tiles. The usage of programmable shaders within graphics systems enables creation and usage of various pixel value buffers and the embodiments can also be applied to such pixel value buffers. For instance, in deferred rendering, normals are written to buffers so that the pixels each then represents a normal (X, Y, Z coordinate, or if unit normals are employed only two coordinates are needed). Also such applications can benefit from the embodiments FIG. 1 is a flow diagram illustrating an embodiment of a method of encoding a tile of pixels, where each pixel has a respective pixel value. The method starts in step S1, where multiple, i.e. at least two, blocks of pixels are variable length encoded. The multiple blocks constitute respective subsets of the tile. In an embodiment, the variable length encoding step S1 encodes all non-overlapping blocks of pixels in the tile. In an alternative embodiment, step S1 variable length encodes all blocks of pixels in the tile except the first block. It could also be possible to divide the tile into different sets of blocks, where all blocks in such a set are variable length encoded in step S1. In either case, the variable length encoding of the multiple blocks in step S1 can be conducted serially or in parallel depending on how many variable length encoders are available in relation to the number of blocks variable length encoded.

The variable length encoding of step S1 generates a respective sequence of symbols as encoded representation of the pixel values of the pixels in a block. The sequences of symbols can be according to any of the traditionally employed symbol alphabets within data encoding. For instance, the alphabet of symbols could be a binary alphabet. In such a case the symbols can be $0_{bin}$ or $1_{bin}$. Other alphabets of symbols that can be used include hexadecimal symbols, i.e. $0$-$9_{hex}$ and A-$F_{hex}$, decimal symbols, i.e. $0$-$9_{dec}$. In a preferred application, a binary alphabet with a sequence of bits is used as an illustrative embodiment of symbol alphabet.

The variable length encoding or non-fixed rate encoding as it is sometimes denoted implies that the encoding generates and outputs sequences of symbols having varying lengths or sizes given different input blocks of pixels, i.e. it is an encoding generating variable lengths. Thus, even if two blocks have the same number of pixels and the pixels have the same type of pixel values, the resulting lengths of the encoded sequences of symbols can be different for the two blocks depending on the particular pixel values in the blocks and the distribution of the pixel values in the blocks. This is a major difference to fixed-rate encoding, which instead outputs sequences of symbols having fixed lengths.

The encoding of the embodiments can be conducted according to any variable length encoding scheme traditionally employed for encoding color or depth buffer data or other pixel value buffers. However, an important difference as compared to the traditional usage of these variable length encoding schemes is that they now will operate on blocks of a tile instead of the complete pixel value buffer. Thus, the embodiments are based on a combination of a tiled architecture and buffer encoding or compression. Examples of suitable variable length encoding schemes that can be employed according to the embodiments are disclosed in Hasselgren and Akenine-Möller, 2006, Efficient Depth Buffer Compression, In Graphics Hardware, 103-110, Rasmusson, Hasselgren and Akenine-Möller, 2007, Exact and Error-bounded Approximate Color Buffer Compression and Decompression, In Graphics Hardware, 41-48, WO 2009/092455, WO 2009/092454 and WO 2009/093947, the teaching of which with regard to variable length encoding schemes is hereby incorporated by reference. The encoding that is conducted according to the embodiments can be based on, for instance, Golomb-Rice coding, Arithmetic coding, Huffman Coding, CABAC (Context-Adaptive Binary Arithmetic Coding). The embodiments are, however, not limited to any particular variable length encoding scheme but can instead be applied to and used in connection with any known encoding scheme that can encodes a block of pixels having pixel values into a sequence of symbols and produces sequences of symbols with different lengths depending on the input blocks of pixels.

Figure 2:
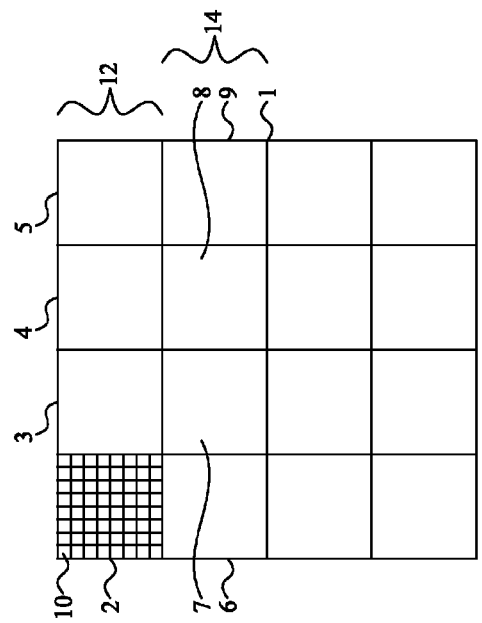
FIG. 2 schematically illustrates a tile according to an embodiment.

FIG. 2 is a schematic illustration of a tile 1 and shows an example of how the tile 1 can be divided into blocks 2-9 of pixels 10. The tile 1 could, in a non-limiting but illustrative example, have a size of 32×32 pixels 10. In such a case, the tile 1 can be divided into 4×4 blocks 2-9, where each block 2-9 consists of 8×8 pixels 10. The sizes of blocks and tiles mentioned above are only illustrative and the embodiments are not limited thereto. Furthermore, the embodiments also encompassed using non-quadratic blocks and tiles, such as rectangular blocks and/or tiles.

In a particular embodiment of step S1 in FIG. 1, all blocks 3-9 except the very first block 2 are variable length encoded together. In an alternative embodiment, all blocks 2-9 of the tile 1 are variable length encoded in step S1.

A characteristic feature of the variable length encoding is that the resulting length or size of the generated sequence of symbols is not fixed but rather variable, hence the name variable length encoding. This implies that the length of a first sequence of symbols, in terms of the number of symbols, obtained in step S1 for one block of pixels may often differ from the length of a second sequence of symbols obtained by variable length encoding another block of pixels. In order to be able to be aware of the respective lengths of the multiple sequences of symbols respective size indications are determined in step S2. In more detail, step S2 determines a size indication for each set of at least one block of the multiple blocks in the tile. The size indication is then representative of a compression ratio of a combined sequence corresponding to the at least one sequence of symbols obtained in step S1 by variable length encoding the at least one block of the set.

In a particular embodiment, each set comprises a single block. In such a case, the size indication determined in step S2 for a block represents the compression ratio of the sequence of symbols obtained by variable length encoding the block.

For instance, a pixel value could be a RGB888 color value with 8 bits per color component and thereby spending in total 24 bits per pixel. A length or size of an uncoded and uncompressed block will then be 1536 bits if a block size of 8×8 pixels is assumed. An exact compression ratio of a bit sequence obtained by variable length encoding such a block would then be X/1536, where X represents the number of bits in the bit sequence. Generally, the size indications can assume a limited set of predefined values representing different predefined compression ratios. For instance, a 2-bit size indication can assume the values $00_{bin}$, $01_{bin}$, $10_{bin}$ or $11_{bin}$. These four values could then represent different predefined compression ratios such as uncompressed, ¾, ½ and ¼. With the above example block size, a bit sequence having a length in the interval 1-384 bits could then be assigned a size indication of $11_{bin}$, a bit sequence with a length in the interval 385-768 bits could then get $10_{bin}$ as size indication and with bit sequence lengths in the interval 769-1152 bits getting a size indication of $01_{bin}$. If the length of the bit sequence would be longer than 1152 bits or the block is left uncompressed the size indication $00_{bin}$ could be used.

Alternative embodiments handle sets comprising multiple blocks per set. FIG. 2 illustrates this concept. Thus, a first set 12 of multiple blocks 2-5 could correspond to the first row of blocks in the tile 1. This means that the first set 12 comprises the blocks 2-5 of this first row. A second set 14 comprises the blocks 6-9 of the second row in the tile 1 and so on. This grouping of blocks in the tile into different sets is not limited to having one set for each row of blocks. Alternative embodiments could use one set per column in the tile, one set per 2×2 group of neighboring blocks, i.e. block 2, 3, 6, 7 respective block 4, 5, 8, 9 in FIG. 2. Actually, any predefined grouping of two or more blocks could be used as a set according to the embodiments.

The size indication determined in step S2 is then representative of the compression ratio of a combined sequence corresponding to the multiple sequences of symbols determined in step S1 for the blocks of the set.

In similarity to the example presented above, the length of a combined sequence of four uncompressed sequences of symbols would be 4×1536=6144 bits. The respective sizes or lengths of the sequences of symbols of the set are then added together and the sum is divided by 6144 bits in order to get the exact compression ratio. The size indication preferably can adopt one of multiple predefined values, such as $00_{bin}$, $01_{bin}$, $10_{bin}$ or $11_{bin}$ for a 2-bit size indication, representing different predefined compression ratios.

Combining multiple sequences of symbols into a combined sequence and determining a size indication for the combined sequence instead of for the individual sequences of symbols can often lead to a more efficient handling of the data. For instance, assume that four bit sequences obtained in step S1 have the following respective sizes 386, 1150, 760 and 772 bits. The bit sequences having sizes 1150 and 760 bits are close to the upper threshold sizes of 1152 and 768 bits (see above). However, the bit sequence having sizes of 386 and 772 bits are instead close to the lower ranges in respective interval. Transferring these bit sequences to a pixel value buffer in a buffer memory is then generally conducted in an inefficient way since the data transfer typically handles the maximum amount of symbols, such as bits, for each compression ratio, i.e. 384, 768, 1152 and 1536 bits in this example. This means that transferring the bit sequence having a size of 772 bits would then amount to transferring the same amount of data, i.e. 1152 bits, as transferring the bit sequence having a size of 1150 bits. The surplus bits, however, do not carrying any useful information and will, during decoding, simply be discarded.

If these four bit sequences are instead handled as a single combined sequence, the total size would be 3068 bits, which is very close to a compression ratio of 50%, i.e. 3072 bits. In this case only 4 "useless" bits need to be transferred over the data bus as compared to 382+2+8+380=772 bits when handling the bit sequences separately according to this example.

The number of values that the size indication can assume can of course differ from the illustrative example presented above. For instance, a size indication of 1 bit can represent two different compression ratios, a size indication of 2 bits enables using four different compression ratios, a 3-bit size indication can indicate up to eight different compression ratios, and so on. In addition, the predefined compression ratios associated with the respective size indication values can of course differ from the example values given in the illustrative example above. The embodiments are therefore not limited to any particular size indication length or to any particular predefined compression ratio values. The size indications determined in step S2 for the different sets of one or more blocks are though of the same size indication length and represent a respective compression ratio of a predefined group of possible compression ratios.

A next step S3 of the method in FIG. 1 arranges the multiple combined sequences, i.e. individual sequence of symbols obtained in step S1 or sets of multiple sequences of symbols obtained in step S1, in a pixel value buffer in a buffer memory. The buffer memory is generally designed to be large enough to house at least one tile presented in uncompressed form. Though highly unlikely, it could be possible that for a particular tile the variable length encoding step S1 is not able to variable length encode the blocks but the output combined sequences are instead the uncompressed pixel values of the pixels in the blocks. In addition, the buffer memory is preferably designed to store a complete pixel value buffer. If the pixel value buffer is divided into multiple non-overlapping tiles, the size of the buffer memory is then preferably selected to be able to store the combined sequences for all these multiple non-overlapping tiles, possibly in uncompressed form.

In order to be able to correctly identify the memory positions occupied by the respective combined sequences in the buffer memory and identify the amount of data that is read from the buffer memory information of the respective lengths of the multiple sequences is needed, i.e. the size indications determined in step S2. As is well known in the art, processing of a tile is typically conducted on-chip in a graphical processing unit. In the prior art, the uncoded and therefore uncompressed pixel values of the tile are written from the on-chip memory in the graphical processing unit to a pixel value buffer in a buffer memory in or connected to a display unit. This means that the uncoded and uncompressed pixel values of the tile are transferred over a data bus from the graphical processing unit to the buffer memory. In clear contrast to the prior art, the amount of data transferred over the data bus when writing the tile to the pixel value buffer is significantly reduced since the tile is divided into blocks that are variable length encoded in step S1. The transfer of the tile data from the graphical processing unit to the buffer memory can therefore be conducted in a much shorter time given a defined data bus width as compared to transferring uncompressed tile data.

The information of the respective lengths of the multiple combined sequences, i.e. the size indications from step S2, needs to be accessible in the display unit during rendering in order to correctly identify the amount of data that should be read from the pixel value buffer in the buffer memory when reading a combined sequence. A simple solution would be to store the size indications in a size indication memory in the graphical processing unit. However, in such a case the display unit needs to access the size indications before it can load and read combined sequences from the buffer memory. This means that a memory request for the size indications must be sent to the graphical processing unit over the data bus. The memory request is processed and started up and performed to retrieve the requested data from the size indication memory. The retrieved data is then transferred over the data bus to the display unit. The above described procedure, however, introduces latency when decoding and rendering the pixel data since an external memory must be accessed. A further problem with this approach is that the memory request and the returned size indications are generally not designed to be efficiently transferred over the data bus. For instance, a size indication could be of only 2 bits, whereas the data bus could be designed to efficiently transfer, for instance, bursts of 512 bits. The memory request and the size indications will then occupy the data bus but in an inefficient way so that the remaining bandwidth of the data bus is not utilized when transferring the memory request and the size indications.

The embodiments solve these problems by arranging the size indications determined in step S2 in the pixel value buffer in the buffer memory in step S4. This means that the information required in order to identify and read the combined sequences from the pixel value buffer will be available in the buffer memory. However, such an arrangement of the size indications in the buffer memory in step S4 is, according to the embodiments, conducted in a particular way that provides an efficient connection between a size indication and its associated combined sequence and in particular enables the identification of the size indication before reading the combined sequence. This is achieved by arranging a size indication, determined for a set in step S2, to precede, in a reading order of the pixel value buffer, the combined sequence, obtained for the set, in the buffer memory. Reading order defines the order in which the combined sequences are read from the pixel value buffer during rendering, for instance when displaying an image on a display. This means that a first combined sequence preceding a second combined sequence according to the reading order will be read from the pixel value buffer before the second combined sequence. As a consequence, when the pixel value buffer is read from the buffer memory according to the reading order the size indication relating to a particular combined sequence is first read before the particular combined sequence. Information of the size of the particular combined sequence can thereby be provided before or during reading the combined sequence. The display unit will therefore get information of the size of a particular combined sequence before or as it reads the combined sequence from the buffer memory.

FIG. 3 schematically illustrates this concept by showing a part of a pixel value buffer 80 in a buffer memory 20. In this illustrative example, each set comprises a single block and a combined sequence therefore comprises the sequence of symbols of a single block. The buffer memory 20 has been illustrated to be designed to be capable of storing sequences of symbols that were not compressed. Reference number 21 indicates a portion of the buffer memory 20 being of a size capable of storing a sequence of symbols in uncompressed form. Reference numbers 23, 29 indicate such sequences of symbols that are uncompressed. However, other sequences of symbols 22, 24, 25, 26, 27, 28 are compressed according to different compression ratios. This means that generally not the whole buffer memory 20 is occupied by useful data when the sequences of symbols 22-29 have been written to the buffer memory 20.

In an embodiment, the size indication 32-39 of a sequence of symbols 22-29 is stored immediately before the sequence of symbols 22-29. In such a case, the buffer memory 20 has advantageously sufficiently large memory areas 21 for being able to store both the size indications 32-39 and the sequences of symbols 22-29. The figure also illustrates the reading order for reading data from the pixel value buffer 80, i.e. from left to right in the figure and row-by-row starting with the upper row. By storing the size indication 32-39 before the relevant sequence of symbols 22-29 according to the reading order the size indication 32-39 will be read from the pixel value buffer 80 before the relevant sequence of symbols 22-29 is read.

In the embodiment illustrated in FIG. 3 the variable length encoding step of FIG. 1 variable length encodes all blocks of the tile to get a sequence of symbols for each block. Additionally, a size indication is determined for each block in the tile. This means that the buffer memory 20 then stores all the sequences of symbols 22-29 preceded in the reading order by their respective size notifications 32-29.

The embodiment illustrated in FIG. 3 generally works fine if reading of symbols from the pixel value buffer 80 can be interrupted based on the processing of the read size notification 32-39. Thus, when reading data from the pixel value buffer 80 in the reading order, the first size notification 32 of the first sequence of symbols 22 is first read. In order to reduce the latency in the reading operation, the reading of data from the pixel value buffer 80 preferably proceeds in parallel with analyzing the read size notification 32. This means that at least a portion of the following data in the pixel value buffer 80, including at least a portion of the first sequence of symbols 22 is typically read before the length or size of the following first sequence of symbols 22 is determined based on the read size notification 32. Various actions can then be taken depending on the reading speed in relation to the time required to processes the size indication 32 to determine the size of the associated sequence of symbols 22 and depending on how many symbols the associated sequence of symbols 22 contain.

It could be possible that, once the read size indication 32 has been processed in order to determine the size of the following sequence of symbols 22, all symbols of the following sequence of symbols 22 have not yet been read. In such a case, the reading of symbols continues in the defined reading order until the number of symbols indicated by the size indication 32 has been read from the buffer memory 20. In an alternative variant, more symbols than what is indicated by the size indication 32 could already have been read once the processing of the size indication 32 is completed. In such a case, the reading of data from the pixel value buffer 80 relating to the relevant sequence of symbols 22 is aborted. Any surplus number of symbols that are read could simply be discarded and not sent further to the decoding step.

FIG. 4 illustrates another embodiment of a pixel value buffer 80 in a buffer memory 20 configured to store combined sequences 41, 43, 45, 47, 51, 53, 55, 57 and the size indications 42, 44, 46, 48, 52, 54, 56, 58 determined for the combined sequences 41, 43, 45, 47, 51, 53, 55, 57. In the figure, reference number 40 indicates a first tile and its data stored in the pixel value buffer 80, whereas reference number 50 indicates a second tile and its stored data. The first combined sequence 41 in the first tile 40 could then correspond to the sequences of symbols obtained from the first row of blocks in the tile 40, the second combined sequence 42 corresponds to the sequences of symbols of the blocks in the set from the second row in the tile 40, and so on.

In the embodiment illustrated in FIG. 3, a tile 1 covers the whole breadth of the pixel value buffer 80. This means that reading data from the pixel value buffer 80 preferably reads the sequences of symbols 22, 23, 24, 25 from the first row of the pixel value buffer 80 in a first reading operation and then reading the sequences of symbols 26, 27, 28, 29 in the second row. However, in FIG. 4, the combined sequences 41, 43, 45, 47, 51, 53, 55, 57 belonging to a tile 40, 50 are stored in different rows of the pixel value buffer 80 in the buffer memory 20. Hence, reading a first row of the pixel value buffer 80 will read a respective first combined sequence 41, 51 in each of multiple different (four in the figure) tiles 40, 50. In a second round, the respective second combined sequences 43, 53 of the tiles 40, 50 are read from the pixel value buffer 80.

Reading of combined sequences in FIG. 4 is basically conducted in the same way as reading individual sequences of symbols in FIG. 3. In other words, the size indication is first read which triggers continuing reading of the following combined sequence or abortion of reading the following combined sequence once the size indication has been processed and the size of the following combined sequence has been determined.

The embodiments described above and illustrated in FIGS. 3 and 4 could therefore imply that in some occasions more symbols than necessary are read and should be discarded or provided further up to the decoding step. Other embodiments described further herein do not have this shortcoming and can be designed to only read the amount of symbols indicated by the respective size notifications.

In these embodiments, the variable length encoding step in FIG. 1 is preferably conducted for all blocks 3-9 in the tile 1 except the first block, such as block 2 in FIG. 2. Correspondingly, the determination of size indications in FIG. 1 is then preferably conducted for all blocks in the tile except the first block. In such a case, the arrangement of sequences of symbols and size indications in the pixel value buffer in the buffer memory in the following two steps S3 and S4 are preferably performed for the blocks except the first block in the tile.

Figure 6:
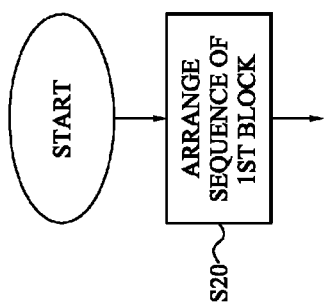
FIG. 6 a flow diagram illustrating an additional, optional step of the method in FIG. 1.

The first block of the tile is instead, in these embodiments, handled separately. FIG. 6 illustrates such an embodiment. The method starts in step S20 where the sequence of symbols corresponding to an uncompressed version of the pixel values in the first block is arranged in and written to the pixel value buffer as a first sequence of symbols in the reading order. Thus, in this embodiment, the first block in each tile is left uncompressed and therefore written directly to the pixel value buffer. No size indication is thereby needed for the first sequence of symbols in the buffer memory. The method then continues to step S1 of FIG. 1, where the remaining blocks of the tile are variable length encoded as previously described. Alternatively, the sequence of symbols of the first block in the tile could be written last to the pixel value buffer. The pixel value buffer will then contain the first sequence of symbols followed, in the reading order, by the multiple sequences of symbols for the remaining blocks and the size indications determined for these remaining blocks. The relative organizations of the size indications and the sequences of symbols for the remaining blocks will be described further below.

FIG. 5 is a flow diagram illustrating an alternative processing of the first block in the tile. In this embodiment the first block is variable length encoded to form a sequence of symbols as encoded representation of the pixel values in the first block in step S10. This variable length encoding of the first block is conducted in the same way as for the remaining blocks in the tile. In similarity to the remaining blocks, a size indication is determined for the first block in step S11 to be representative of a compression ratio of the sequence of symbols obtained in step S10 for the first block. The sequence of symbols for the first block is arranged in and written to the pixel value buffer in step S12. The sequence of symbols will then be arranged as a first sequence in reading order for the portion of the pixel value buffer assigned to the current tile. The sequences of symbols determined for the remaining sequences will then follow the first sequence in the reading order of the pixel value buffer. However, in contrast to the size indications for the remaining blocks, which are stored in the buffer memory, preceding respective sequence of symbols in the reading order, the size indication determined for the first block in step S11 is handled separately. Step S13 therefore stores the size indication determined for the first block in the tile in a memory different from the buffer memory or in a memory location of the buffer memory but different from the memory location of the pixel value buffer. This memory could be the on-chip memory or dedicated size indication memory in the graphical processing unit, a separate memory in the display unit or a dedicated, separate part of the buffer memory.

If storing the size indication in a memory of the graphical processing unit, a memory request is thereby needed to read the data from the memory in the graphical processing unit and transfer the data to the display unit. However, in this embodiment only a single such memory request is needed per tile. The total latency when reading data of tile from the buffer memory can thereby be kept very low since no memory requests to external memories are needed for the remaining sequences of symbols and blocks of the tile.

Storing the size indication in a memory of the display unit implies that no external memory requests need to be transmitted thereby even further reducing any latency. In such case, the size indication for the first block is preferably stored in a dedicated memory location, the position of which is predefined. For instance, if a pixel value buffer is divided into eight tiles, only eight size indications need to be stored separately for the whole pixel value buffer in this embodiment. In such a case, memory positions can be assigned to these eight size indications and configured to only store such size indications. The position for the size indication of the first block in respective tile is further defined so that the size indication can be read from the memory without any explicit information of where it is stored.

Thus, in this embodiment the pixel value buffer in the buffer memory comprises variable length encoded sequences of symbols for all blocks in a tile and size indications for all blocks except the first block. The size indication for the first block is instead stored in a separate memory or predefined memory position.

Step S10 to S13 of FIG. 5 does not necessarily have to be conducted serially relative to steps S1 to S4. In clear contrast, the operations of steps S1 and S10 can be conducted in parallel as can the operations of steps S2 and S11, steps S12 and S3 and steps S13 and S4. In addition, steps S10 to S13 can in fact be conducted after steps S1 to S4 in FIG. 1.

Figure 7:
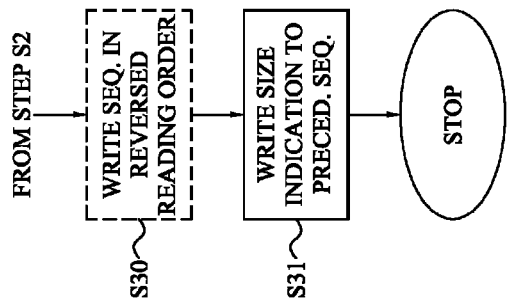
FIG. 7 is a flow diagram illustrating an embodiment of arranging sequences of symbols and arranging size indications in FIG. 1.

FIG. 7 is a flow diagram illustrating an embodiment of steps S3 and S4 of FIG. 1. This embodiment is particularly advantageous when employed in connection with the embodiments described above in connection with FIGS. 5 and 6.

The method continues from step S2 in FIG. 1. A next optional step S30 writes the multiple sequences of symbols in a reversed order to the buffer memory. For instance and with reference to FIG. 2, the sequence of symbols corresponding to the encoded representation of the last block in the tile 1 is first written to the pixel value buffer and to the particular memory position assigned to this last block. The sequence of symbols corresponding to the second last block of the tile 1 is then written to the pixel value buffer memory at a position preceding the memory position of the last block according to the reading order of the pixel value buffer. This means that the sequence of symbols corresponding to block 9 in FIG. 2 will be written to the pixel value buffer before writing the sequence of symbols for block 8, which in turn is written to the pixel value buffer before writing the encoded representation of block 7. The last sequence of symbols that is written to the pixel value buffer is, in this example, an uncompressed version (according to FIG. 6) or a variable length encoded version (according to FIG. 5) of the first block 2.

The reversed order employed in step S30 for writing the combined sequences to the pixel value buffer could be the reversed reading order of the pixel value buffer as mentioned above. Alternatively, other reversed orders can be used including a reversed Morton order or a reversed Hilbert order, which is further described herein.

In addition, step S31 of the method writes the respective size indications determined for the blocks to the pixel value buffer. Step S31 involves writing the size indication determined for a block in connection with a preceding sequence of symbols preceding, in the reading order of the pixel value buffer, the sequence of symbols obtained by variable length encoding the current block. This step S31 is typically conducted in parallel with step S30 to write a sequence of symbols and a size indication together to the pixel value buffer. The loop formed by steps S30 and S31 is then repeated for other sequences of symbols and size indications in the tile.

FIG. 8 schematically illustrates this concept of storing size indications. The last position of the pixel value buffer 80 assigned to a current tile is assigned to the sequence of symbols corresponding to an encoded representation of the last block of the tile. However, the size indication determined for this last block is not stored in connection with the last sequence of symbols but rather in connection with the sequence of symbols obtained for a preceding block in the tile. This is more evident by looking at the first row in the pixel value buffer 80 and the corresponding first row of blocks 2-5 in the tile 1 in FIG. 1. Thus, the size indication 35 defining the size of the sequence of symbols 25 of the block with reference number 5 is stored in the pixel value buffer 80 in connection with the sequence of symbols 24 obtained for the preceding block 4 in the tile 1 according to the reading order of the pixel value buffer 80. However, the size indication 34 of this preceding block 4 is in turned stored in the pixel value buffer 80 in connection with the sequence of symbols 23 of block 3 in the tile 1. This means that the second first block 3 has its size indication 33 stored in connection with the sequence of symbols 22 from the first block 2 in the tile. 1.

In this embodiment, the first block 2 is either stored in uncompressed form and therefore does not have any assigned size indication or its size indication is stored in another memory or memory location if the first block 2 is indeed variable length encoded.

In an embodiment, storing the size indication of a given block in connection with the sequence of symbols of a preceding block is implemented by providing the size indication directly following the end of the sequence of symbols of the preceding block. FIG. 8 illustrates such an embodiment. Alternatively, the size indications could be stored directly before the sequence of symbols of the preceding block. This is illustrated in FIG. 17. In such a case, a size indication 33 of a current sequence of symbols 23 precedes the symbols of a preceding sequence of symbols 22 in the pixel value buffer. This embodiment is, in some applications, preferred over the one illustrated in FIG. 8, since the size indication of a given sequence of symbols will be read and obtained directly when reading the preceding sequence of symbols. This means that the size indication is available in advance of having to read through the complete sequence of the preceding sequence of symbols. In parallel processing, this means that the time from reading and processing a size indication until its associated sequence of symbols can be identified and read will be reduced.

FIG. 18 illustrates another embodiment of arranging the size indications in connection with the sequence of symbols of a preceding block. In this embodiment, the size indications are stored at the last memory positions assigned to the respective sequences of symbols. This means that the size indication 33 of a current sequence of symbol 23 is stored after the symbols of a preceding sequence of symbols 22 and furthermore preferably at the last memory positions assigned to this preceding sequence of symbols 22 in the buffer memory 20.

The above presented embodiments disclosed in FIGS. 8, 17 and 18 are illustrative examples of arranging the size indications relative the associated respective sequences of symbols. The embodiments also encompassed storing the size indications in some other predefined position within the memory area assigned to this preceding block and relative the sequence of symbols of the preceding block. In addition, the size indication could be stored in connection with the sequence of symbols positioned two or more steps earlier, according to the reading order of the pixel value buffer, than the current sequence of symbols. This is particularly preferred if multiple parallel decoders will be used so that the size indication of a given sequence of symbols can be read and provided to correct decoder before the correct decoder starts to process the given sequence of symbols.

In these embodiments, when the symbols of a sequence of symbols are read from the pixel value buffer 80, such as the sequence of symbols 23 of the second block 2 in the tile 1, the size indication 34 belonging to the next block 4 in the tile 1 according to the reading order is also read from the pixel value buffer 80. The read size indication 34 thereby enables determination of the number of symbols to read from the pixel value buffer 80 when reading the next sequence of symbols 24 in the pixel value buffer 80 according to the reading order. Hence, reading a given sequence of symbols from the pixel value buffer also provides the size indication of the next sequence of symbols to be read from the pixel value buffer. These embodiments therefore do not have to abort the reading process or run a "risk" of reading unnecessary or too many symbols.

The above presented embodiments utilizes individually variable length encoded blocks and individual handling of tiles. This means that the size indications generated for a sequence of symbols of a tile are stored in connection with another sequence of symbols of the same tile. However, it is also possible to store size indications in connection with a sequence of symbol belonging to another tile in the pixel value buffer. For instance and with reference to FIG. 8, assume that the pixel value buffer 80 extends at least one tile further to the right in the figure. Thus, the pixel value buffer 80 is at least two tiles "wide". In such a case, the size indication with reference number 36 in FIG. 8 would be the size indication determined for the first block and sequence of symbol in a next tile of the pixel value buffer 80. Thus, the last size indication 36 in each row of sequences of symbols of a tile 1 is associated with a sequence of symbol belonging to a next tile in the pixel value buffer 80. The pixel value buffer 80 is then preferably read by reading row-by-row, which means that sequences of symbols belonging to at least two tiles will be read when reading each row.

The variable length encoding of the multiple blocks in the tile can also be conducted according to the reversed order. In such a case, the last block of the tile is first variable length encoded, followed by the second last block and so up to the first block that is either left uncoded or is variable length encoded. In such a case it is possible to write sequence of symbols to the pixel value buffer while variable length encoding other blocks in the tile. Hence, the variable length encoding and the writing to the pixel value buffer can be conducted at least partly in parallel. In an alternative approach, the blocks of the tile are first variable length encoded, optionally omitting the first block, according to the reading order and then, once the variable length encoding is completed, the obtained sequences of symbols are written to the pixel value buffer but in reversed reading order.

Figure 9:
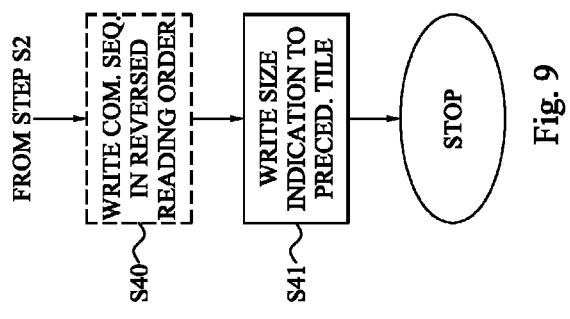
FIG. 9 is a flow diagram illustrating another embodiment of arranging sequences of symbols and arranging size indications in FIG. 1.

The above described concepts can also be applied to the case when writing combined sequences, each comprising multiple sequences of symbols. FIG. 9 comprises an embodiment of steps S3 and S4 of FIG. 1. A next optional step S40 writes the combined sequences in reversed order, such as reversed reading order of the pixel value buffer, reversed Morton order or reversed Hilbert order. In this embodiment, the combined sequences of a last tile is first written to the pixel value buffer, followed by the combined sequences of a next last tile and so on up to the first tile in the pixel value buffer. A next step S41 writes, for each set of a tile, the size indication determined for the set to the pixel value buffer in connection with a preceding combined sequence of a preceding tile. The preceding tile then precedes the current tile according to the reading order of the pixel value buffer. Steps S40 and S41 are typically conducted in parallel so that a combined sequence is written to the pixel value buffer together with a size indication. This means that the loop of steps S40 and S41 is repeated for the other combined sequences.

FIG. 10 schematically illustrates a buffer memory 20 with a pixel value buffer 80 storing combined sequences 41, 43, 45, 47, 51, 53, 55, 57, 61, 63, 65, 67, 71, 73, 75, 77 of four different tiles 40, 50, 60, 70. In this embodiment, the size indication 52, 54, 56, 58 determined for a given combined sequence 51, 53, 55, 57 of a current tile 50 is stored directly following, in the reading order of the pixel value buffer 80, the preceding combined sequence 41, 43, 45, 47 present in the same row of the pixel value buffer 80 but belonging to a preceding tile 40 according to the reading order. This means that when the first combined sequence 41 of the preceding tile 40 is read from the pixel value buffer 80 the size indication 52 of the first combined sequence 51 in the current tile 51 is also read.

In similarity to the embodiments of FIGS. 8, 17 and 18, the size indications of the combined sequences of a tile does not necessarily have to be stored in connection with the combined sequences of the first preceding tile but could instead in some other of the preceding tiles preceding, according to the reading order, the current tile. Furthermore, the size indications could be stored immediately following the combined sequences of a preceding tile, see FIG. 10, preceding the combined sequences of a preceding tile, compare with FIG. 17, or at the last memory positions assigned to the combined sequences of a preceding tile in the pixel value buffer, compare with FIG. 18.

Furthermore, in an embodiment the combined sequences 41, 43, 45, 47 of the first tile 40 in the pixel value buffer 80 are stored in uncompressed form in the buffer memory 20. In an alternative approach, the combined sequences 41, 43, 45, 47 of the first tile 40 could be in compressed form but then the respective size indications determined for the first tile 40 are stored in another memory accessible to the display unit.

The embodiment illustrated in FIG. 10 stores size indications determined for combined sequences of a given tile in connection with combined sequences from another tile in the pixel value buffer. In an alternative approach, the size indications are instead stored in connection with a preceding combined sequence of the same tile. For instance, tile 50 and combined sequence 51 could be followed by a size indication 62 determined for and associated with the next combined sequence 53 of the tile 50. This next combined sequence 53 is in turn followed by the size indication 64 determined for the combined sequence 55 in the third row of the tile 50, and so on. The last combined sequence 57 of the tile 50 then typically does not have any following size indication in this embodiment.

Figure 11:
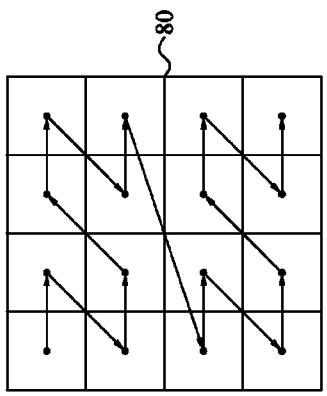
FIG. 11 schematically illustrating writing to a pixel value buffer based on a reversed Morton order.

In particular embodiments, the combined sequences are written to the pixel value buffer according to the reading order or preferably the reversed reading order. In an alternative approach, the combined sequences can be written to the buffer memory according to a Morton order or preferably a reversed Morton order. FIG. 11 schematically illustrates a pixel value buffer 80 storing the combined sequences of 4×4 tiles. Assume that the tiles are identified by their respective coordinates in the pixel value buffer 80, i.e. (x, y). In a first step the combined sequences of tile (4,4) are generated and the size indications of tile (4, 4) are determined. The combined sequences of tile (4, 4) are written to the pixel value buffer 80 and the size indications of tile (4, 4) are temporarily stored in the graphical processing unit. Thereafter, the combined sequences and size indications for tile (3, 4) are determined. The combined sequences of tile (3, 4) are written to the pixel value buffer 80 followed by the previously temporarily stored size indications of tile (4, 4). The size indications of tile (3, 4) are temporarily stored in the graphical processing unit. The next tile that is written to the pixel value buffer 80 is tile (4, 3) according to the reversed Morton order. However, at this point in time the size indications that should follow the combined sequences of tile (4, 3), i.e. size indications from tile (1, 4), are typically not determined. No size indications are therefore stored in connection with the combined sequences of tile (4, 3). The procedure continues by writing the combined sequences of tile (3, 3) to the pixel value buffer 80 followed by the size indications determined for tile (4, 3). Thereafter the combined sequences of tile (2, 4) are stored together with the size indications of tile (3, 4) previously determined and temporarily stored in the graphical processing unit. The size indications of tile (2, 4) are also determined and temporarily stored in the graphical processing unit. The combined sequences of tile (1, 4) are preferably stored in uncompressed form since the combined sequences of tile (4, 3) in connection with which the size indications should have been stored are already written to the pixel value buffer 80.

Alternatively, the combined sequences of tile (1, 4) could be provided in compressed form but then the size indications of tile (1, 4) need to be stored in some other memory or memory location than the pixel value buffer 80 in the buffer memory.

The writing to the pixel value buffer 80 continues by determining the combined sequences and size indications of tile (2, 3). The size indications of tile (2, 3) are temporarily stored, while the combined sequences of tile (2, 3) are written to the pixel value buffer together with the size indications of tile (3, 3) previously determined and temporarily stored. This procedure is then conducted according to the reversed Morton order for the remaining tiles of the pixel value buffer. In the example illustrated in FIG. 11, the combined sequences of tiles (1, 1), (1, 2) and (1, 3) are either stored in uncompressed form or the size indications of these tiles (1, 1), (1, 2) and (1, 3) are provided in some other memory. This means that 18.75% of the tiles in the pixel value buffer 80 need to be provided in uncompressed form or having size indications stored elsewhere. The corresponding numbers for a pixel value buffer 80 of 8×8 tiles and 16×16 tiles are 10.94% and 5.86% of the tiles.

The above described principle of writing combined sequences and size indications according to reversed Morton order or reversed Z-order, as it is also denoted, can be applied to other space-filling orders used within graphics systems, including a reversed Hilbert order. Generally, a reversed Hilbert order is less preferred as compared to using a reversed order that is the opposite to the reading order pixel value buffer or the reversed Morton order. The reason being that a larger number of tiles need to be written in uncompressed form when using the reversed Hilbert order as compared to reversed reading order and reversed Morton order.

Figure 12:
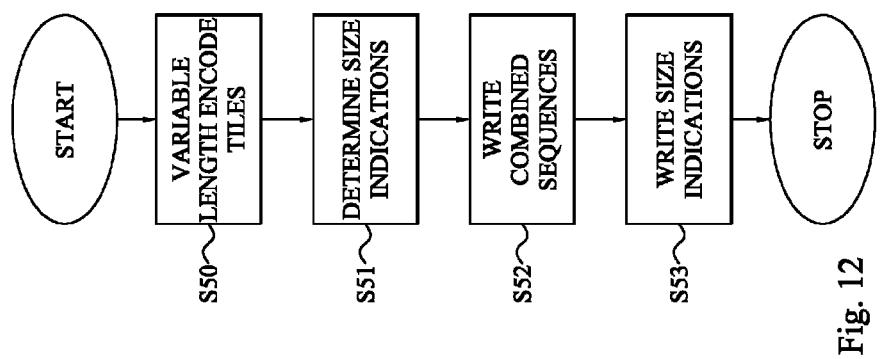
FIG. 12 is a flow diagram illustrating a method of encoding a pixel value buffer according to an embodiment.

FIG. 12 is a flow diagram illustrating a method of encoding a pixel value buffer comprising multiple tiles of pixels according to an embodiment. The method starts in step S50, which variable length encodes a tile of a least a portion of the multiple tiles in the pixel value buffer. The variable length encoding step S50 involves variable length encoding multiple blocks of pixels constituting respective subsets of the tile to form multiple sequences of symbols as encoded representations of the pixel values of the pixels in these multiple blocks. Thus, for each tile of the at least a portion of multiple tiles in the pixel value buffer multiple sequences of symbols are generated in step S50. In a particular embodiment, step S50 variable length encodes all respective blocks in the relevant tile. With reference to FIG. 2 illustrating an embodiment of a tile 1 with 16 blocks 2-9 of pixels 10, sixteen sequences of symbols would be generated in step S50.

A next step S51 determines a size indication for each set of multiple blocks in the tile. The size indication is representative of a compression ratio of a combined sequence corresponding to multiple sequences of symbols obtained in step S50. FIG. 2 schematically illustrates that a set 12, 14 comprises the four block 2-5, 6-9 per row in the tile 1, resulting in total in four sets with four combined sequences and four size indications.

A next step S52 writes the combined sequences of the tile to the pixel value buffer in a buffer memory. The combined sequences are furthermore written in a reversed order. The reversed order is preferably an order that is opposite to the reading order of the pixel value buffer. For instance, if the pixel value buffer is read row-by-row from left to the right starting at the first row, the reversed order would first write the last tile corresponding to the lower right corner in the pixel value buffer followed by the next last tile positioned on the same row but one step to the left. The last combined sequences that are then written to the pixel value buffer are those that come from the tiles in the first row. In an alternative implementation, the reversed order is a reversed Morton order as discussed above in connection with FIG. 11. The combined sequences of the tile at the bottom right corner is then first written to the pixel value buffer in the buffer memory followed in the reversed order that is opposite to the order shown by the arrows in FIG. 11. Yet another example of reversed order that can be used in step S52 is the reversed Hilbert order.

Step S53 writes the size indications determined in step S51 to the pixel value buffer in the buffer memory. The size indications determined for a given tile are written to the pixel value buffer in connection with the preceding combined sequences of a preceding tile. The preceding tile is then preceding the given tile according to the reading order of the pixel value buffer. In a particular embodiment, the size indications are written to the pixel value buffer to directly follow, according to the reading order of the pixel value buffer, the preceding combined sequences of the preceding tile. Steps S52 and S52 are typically conducted in parallel and repeated once for each combined sequence and size indication in the tile. Steps S50 to S53 are then repeated for a next tile to be written to the pixel value buffer in compressed form.

The number of tiles in the pixel value buffer, for which combined sequences are generated by variable length encoding blocks and for which size indications are determined, depends on the reversed order employed for writing combined sequences to the pixel value buffer in the buffer memory. If the reversed order is equal to the reversed reading order of the pixel value buffer, all tiles in the pixel value buffer except the first tile are preferably variable length encoded and have size indications. The first tile can then be written to the pixel value buffer in uncompressed form. Alternatively, it can be variable length encoded as the other tiles but then the size indications determined for the tile are preferably stored in a memory separate from the buffer memory.

If a reversed Morton order is employed tiles in the first column of the pixel value buffer are preferable left uncompressed or, if being variable length encoded and compressed, the determined size indications are preferably stored in a memory separate from the buffer memory. For instance, in FIG. 11 all tiles in the first column except the tile at coordinate (1, 3) are preferably uncompressed.

Figure 13:
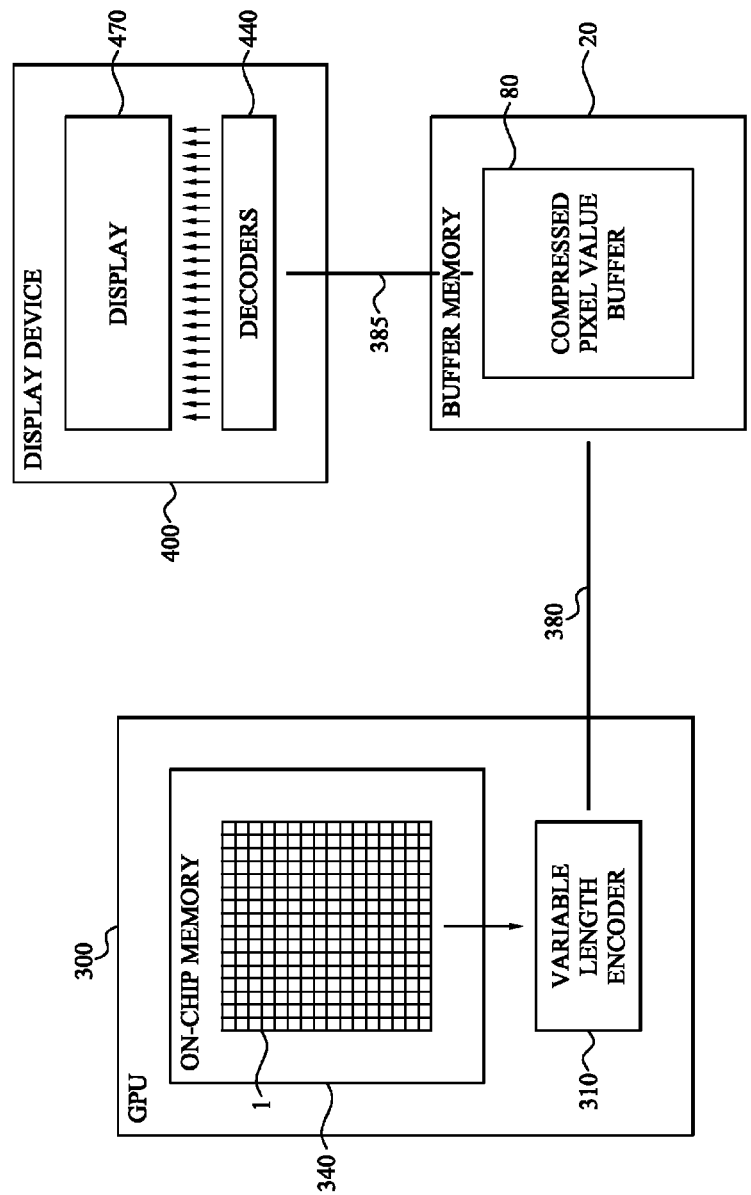
FIG. 13 is a schematic overview of a system for displaying images according to an embodiment.

FIG. 13 is an overview of a graphics system according to an embodiment. The graphics system comprises three main units or entities: a graphical processing unit 300, denoted GPU in the figure, the buffer memory 430 and a display device 400 interconnected via data buses 380, 385. The graphics system can be implemented in any data processing unit or terminal. Non-limiting examples include computers, including laptops, game consoles, mobile telephones and other mobile processing units, such as personal digital assistants, iPad and other tablet computers.

The graphical processing unit 300 comprises an on-chip memory 340 configured to store a tile 1 as it is being encoded by a variable length encoder 310. The resulting respective combined sequences are transferred from the on-chip memory 340 over the data bus 380 to a buffer memory 20. The buffer memory 20 then comprises a pixel value buffer 80 provided in encoded and compressed form. When displaying data on a display 470 of the display device 400 or connected to the display device 400, encoded data corresponding to at least a part of the compressed pixel value buffer 80 is read from the buffer memory 20 and provided to a set of parallel decoders 440 over a data bus 385. The decoders 440 then decode the fetched encoded data in order to get pixel values that can be displayed on the display 470.

In alternative implementation embodiments, a single data bus is employed to transfer data from the GPU 300 to the buffer memory 20 and from the buffer memory 20 to the display device 400. It could also be possible to arrange the buffer memory 20 as a part of the display device 400.

Figure 16:
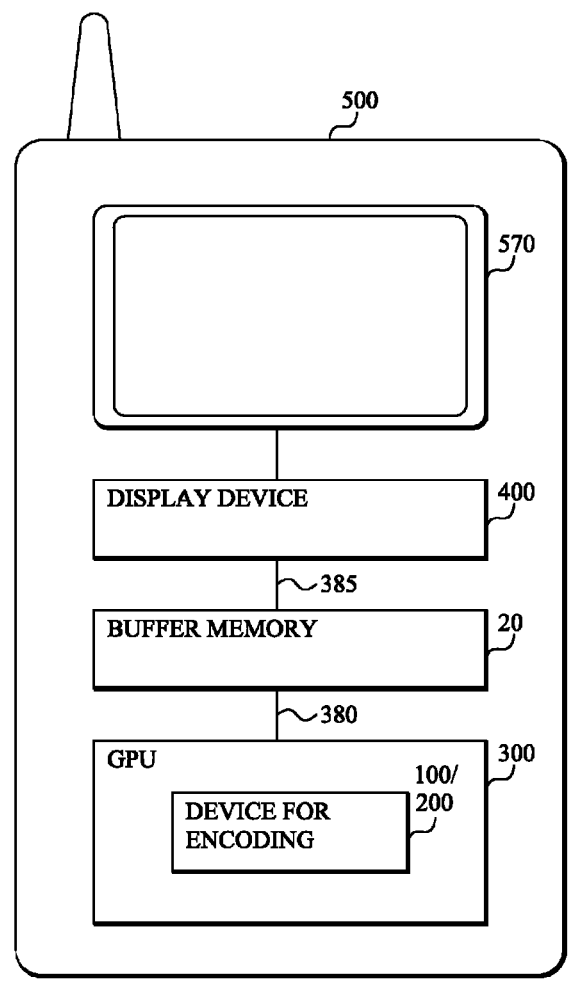
FIG. 16 is an illustration of a user terminal according to an embodiment.

FIG. 16 schematically illustrates a user terminal 500 in the form of a mobile telephone 500. The mobile telephone 500 then comprises a GPU 300 with a device for encoding a tile 100 or a device for encoding a pixel value buffer 200 as will be further described below. A data bus 380 interconnects the GPU 300 with a buffer memory 20, which in turn is connected to a display device 400 having or being connected to a display 570 via a data bus 385.

FIG. 14 is a schematic block diagram of device 100 for encoding a tile according to an embodiment. The device 100 comprises a variable length encoder or variable length encoding circuit 110 configured to variable length encode multiple blocks of pixels to form respective sequences of symbols. The device 100 could comprise a single variable length encoder 110 that operates serially on the pixel values of the multiple blocks. Alternatively, the device 100 comprises a set of multiple variable length encoders 110 that can operate in parallel on pixel data from different blocks in the tile. The variable length encoder 110 is preferably configured to operate according to any of the previously mentioned variable length encoding schemes.

A compression rate determiner or compression rate determining circuit 120 is implemented in the device 100 to determine a respective size indication for each set of at least one block in the tile. The size indication is then representative of the compression ratio of a combined sequence corresponding to the at least one sequence of symbols obtained from the variable length encoder 110 for the at least one block of the set.

A sequence arranger or sequence arranging circuit 130 of the device 100 is configured to arrange the combined sequences in a pixel value buffer in the buffer memory. The sequence arranger 130 is consequently implemented to provide the combined sequences from the on-chip memory 160 optionally via a general input and output (I/O) unit 170 to the buffer memory over a data bus. The I/O unit 170 is preferably connected to the data bus via one or more I/O ports. The device 100 also comprises an indication arranger or indication arranging circuit 140 configured to arrange the size indication determined by the compression rate determiner 120 for a set to precede the combined sequence of the set according to the reading order of the pixel value buffer. The indication arranger 140 therefore transfers the size indications from the on-chip memory 160 to the external buffer memory via the data bus and the optional I/O unit 170. In an embodiment, the sequence arranger 130 and the indication arranger 140 could be implemented as separate units or circuits in the device 100. In an alternative approach, the functions performed by these units or circuits could be implemented together in a single unit or circuit of the device 100.

In a particular embodiment, the sequence arranger 130 is configured to write respective sequences of symbols to the pixel value buffer in the buffer memory and preferably according to a reversed reading order. In such a case, each set preferably consists of a respective block and each combined sequence is equal to the sequence of symbol determined for the respective block.

The indication arranger 140 is preferably configured to write the size indication determined by the compression rate determiner 120 for a given block in connection with a preceding sequence of symbols in the pixel value buffer. The preceding sequence of symbols then precedes the sequence of symbols for the given block according to the reading order of the pixel value buffer. In a particular embodiment, the indication arranger 140 provides the size indication directly following the preceding sequence of symbols according to the reading order of the pixel value buffer. In such a case, each sequence of symbols is preferably followed by the size indication determined for the next following sequence of symbols. This further means that the last sequence of symbols in the tile will not have any following size indication. Alternatively, the size indications can be provided directly in front of the preceding sequence of symbols or at the last memory positions in the pixel value buffer assigned to the preceding sequence of symbols.

In an embodiment, the first sequence of symbols corresponding to the first block in the tile is provided in uncompressed form. The sequence arranger 130 then writes the symbols of the sequence of symbols to the pixel value buffer at a first buffer memory location followed by the multiple sequences of symbols for the remaining blocks in the tile. No size indication is then determined by the compression rate determiner 120 for the first sequence of symbols.

In an alternative embodiment the variable length encoder 110 variable length encodes the first block to get a first sequence of symbols. The compression rate determiner 120 determines a size indication representative of a compression ratio of the first sequence of symbols. The sequence arranger 130 writes the first sequence of symbols as the first sequence of symbols in the pixel value buffer followed, in the reading order, by the remaining multiple sequence of symbols in the tile. The indication arranger 140 is then preferably configured to store the size indication determined for the first sequence of symbols in the on-chip memory 160 and provide it to the display unit upon an explicit request for the size indication. Alternatively, the indication arranger 140 could write the size indication to a predefined memory location in a memory accessibly the display unit.

In an embodiment, the compression rate determiner 120 determines a respective size indication for each set comprising a predefined multiple number of respective blocks in the tile. The sequence arranger 130 could then be configured to write the combined sequences in reversed reading order, reversed Morton order or reversed Hilbert order.

The indication arranger 140 is preferably configured to write the size indication determined for each set of blocks in a tile in connection with a preceding combined sequence of a preceding tile in the pixel value buffer. The size indication is preferably written to the pixel value buffer to directly follow or precede the preceding combined sequence according to the reading order of the pixel value buffer.

In this embodiment up to all tiles expect the last tile in the pixel value buffer has respective combined sequences followed by size indications applicable to the combined sequences of a next tile according to the reading order. The combined sequences of the first tile in the pixel value buffer could be written in uncompressed form to the buffer memory by the sequence arranger 130. In an alternative embodiment, the sequence arranger 130 writes combined sequences obtained from the variable length encoder to the buffer memory, whereas the indication arranger 140 writes the size indications determined by the compression rate determiner 120 for the first tile to some other memory location instead of the pixel value buffer.

The units or circuits 110-140, 170 of the device 100 may be implemented or provided as hardware or a combination of hardware and software. In the case of a software-based implementation, a computer program product implementing the device 100 or a part thereof comprises software or a computer program run on a general purpose or specially adapted computer, processor or microprocessor. The software includes computer program code elements or software code portions illustrated in FIG. 14. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks.

The units or circuits 110-170 of the device 100 are preferably implemented in a graphical processing unit as illustrated in FIG. 13 and can be present on a graphics chip. In such a case, the units or circuits 110-170 are advantageously implemented in hardware using any conventional technology, such as integrated circuit technology, including both general-purpose electronic circuitry and application-specific circuitry.

FIG. 15 is a schematic block diagram of an embodiment of a device 200 for encoding a pixel value buffer. The device 200 comprises a variable length encoder 210 configured to variable length encode blocks of pixels for each tile of at least a portion of the multiple tiles in the pixel value buffer. The multiple blocks constitute respective subsets of the tile. The device 200 and the variable length encoder 210 typically operates on one tile at a time. The output of the variable length encoder 210 for an input tile is multiple sequences of symbols that are encoded representations of the pixel values of the pixels in the multiple blocks of the input tile.

The device 200 could comprise a single variable length encoder 210 that operates serially on the pixel values of the multiple blocks. Alternatively, the device 200 comprises a set of multiple variable length encoders 210 that can operate in parallel on pixel data from different blocks in the tile. The variable length encoder 210 is preferably configured to operate according to any of the previously mentioned variable length encoding schemes.

A compression rate determiner or compression rate determining circuit 220 is implemented to determine a size indication for each set of multiple blocks in the tile. The size indication is then representative of a compression ratio of a combined sequence corresponding to the multiple sequences of symbols obtained from the variable length encoder 210 for the multiple blocks of the set.

The device 200 preferably also comprises a memory 260, such as on-chip memory 260 in which the determined combined sequences and size indications are at least temporarily stored before written to the pixel value buffer in an external buffer memory. Writing to the external buffer memory is optionally conducted through an I/O unit or circuit 270 of the device that provides the interface to the data bus over which the data is transferred to the buffer memory. The 110 unit 270 is preferably connected to the data bus via one or more I/O ports.

A sequence writer or sequence writing circuit 230 of the device 200 is configured to write, optionally by means of the I/O unit 270, the combined sequences obtained from the variable length encoder 210 for the tile. The sequence writer 230 writes these combined sequences to the pixel value buffer in the buffer memory according to a reversed order as previously described.

The device 200 also comprises an indication writer or indication writing circuit 240 for writing the size indications determined by the rate determiner 220 to the pixel value buffer in the buffer memory. In particular, the indication writer 240 writes the size indications determined for a tile of the at least a portion of the multiple tiles to the pixel value buffer in connection with preceding combined sequences of a preceding tile. The preceding tile then precedes the current tile according to the reading order of the pixel value buffer. An implementation embodiment of the indication writer 240 writes the size indications determined for a current tile to directly follow the preceding combined sequences of the preceding tile in the pixel value buffer and according to the reading order of the pixel value buffer. Alternatively, the size indications can be stored to precede the preceding combined sequences or be provided at the last memory locations assigned to the preceding combined sequences in the pixel value buffer.

In an embodiment, the sequence writer 230 and the indication writer 240 could be implemented as separate units or circuits in the device 200. In an alternative approach, the functions performed by these units or circuits could be implemented together in a single unit or circuit of the device 200.

The units or circuits 210-240, 270 of the device 200 may be implemented or provided as hardware or a combination of hardware and software. In the case of a software-based implementation, a computer program product implementing the device 200 or a part thereof comprises software or a computer program run on a general purpose or specially adapted computer, processor or microprocessor. The software includes computer program code elements or software code portions illustrated in FIG. 15. The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks.

The units or circuits 210-270 of the device 200 are preferably implemented in a graphical processing unit as illustrated in FIG. 13 and can be present on a graphics chip. In such a case, the units or circuits 210-270 are advantageously implemented in hardware using any conventional technology, such as integrated circuit technology, including both general-purpose electronic circuitry and application-specific circuitry.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of encoding a tile of pixels each having a respective pixel value, said method comprising:
   variable length encoding multiple blocks of pixels constituting respective subsets of said tile to form multiple sequences of symbols as encoded representations of pixel values of said pixels in said multiple blocks;
   determining, for each set of at least one block of said multiple blocks, a size indication representative of a compression ratio of a combined sequence corresponding to the at least one sequence of symbols obtained by variable length encoding said at least one block of said set;
   arranging said combined sequences in a pixel value buffer in a buffer memory; and
   arranging, for each set, a size indication determined for said set to precede, according to a reading order of said pixel value buffer, said combined sequence in said pixel value buffer in said buffer memory.

2. The method according to claim 1, wherein each set comprises one respective block of said multiple blocks and wherein arranging said size indication comprises writing, for each block of said multiple blocks, said size indication determined for said block to said pixel value buffer in said buffer memory in connection with a preceding sequence of symbols preceding, according to said reading order of said pixel value buffer, said sequence of symbols obtained by variable length encoding said block.

3. The method according to claim 2, wherein writing said size indication comprises writing, for each block of said multiple blocks, said size indication determined for said block to said pixel value buffer in said buffer memory directly following or directly preceding, according to said reading order of said pixel value buffer, said preceding sequence of symbols.

4. The method according to claim 2, further comprising arranging a sequence of symbols corresponding to an uncompressed version of a first block in said tile as a first sequence of symbols in said pixel value buffer in said buffer memory followed by said multiple sequences of symbols according to said reading order of said pixel value buffer.

5. The method according to claim 2, further comprising:
   variable length encoding a first block of pixels in said tile to form a sequence of symbols as encoded representations of pixel values of said pixels in said first block in said tile;
   determining a size indication representative of a compression ratio of said sequence of symbols obtained by variable length encoding said first block in said tile;
   arranging said sequence of symbols, obtained by variable length encoding said first block in said tile, as a first sequence of symbols in said pixel value buffer in said buffer memory followed by said multiple sequences of symbols according to said reading order of said pixel value buffer; and
   storing said size indication determined for said first block in said tile in a memory location different from said pixel value buffer in said buffer memory.

6. The method according to claim 2, wherein arranging said combined sequences comprises writing said combined sequences to said pixel value buffer in said buffer memory in a reversed order selected from the group of a reversed Morton order, a reversed Hilbert order and an order that is opposite to said reading order.

7. The method according to claim 1, wherein each set comprises a predefined multiple number of respective blocks of said multiple blocks and arranging said size indication comprises writing, for each set, said size indication determined for said set to said pixel value buffer in said buffer memory in connection with a preceding combined sequence of a preceding tile preceding, according to said reading order of said pixel value buffer, said tile.

8. The method according to claim 7, wherein writing said size indication comprises writing, for each set, said size indication determined for said set to said pixel value buffer in said buffer memory directly following or directly preceding, according to said reading order of said pixel value buffer, said preceding combined sequence of said preceding tile.

9. A device for encoding a tile of pixels each having a respective pixel value, said device comprising:
   a variable length encoder configured to variable length encode multiple blocks of pixels constituting respective subsets of said tile to form multiple sequences of symbols as encoded representations of pixel values of said pixels in said multiple blocks;
   a compression rate determiner configured to determine, for each set of at least one block of said multiple blocks, a size indication representative of a compression ratio of a combined sequence corresponding to the at least one sequence of symbols obtained by variable length encoding said at least one block of said set by said variable length encoder;
   a sequence arranger configured to arrange said combined sequences in a pixel value buffer in a buffer memory; and
   an indication arranger configured to arrange, for each set, a size indication determined by said compression rate determiner for said set to precede, according to a reading order of said pixel value buffer, said combined sequence in said pixel value buffer in said buffer memory.

10. The device according to claim 9, wherein each set comprises one respective block of said multiple blocks and said indication arranger is configured to write, for each block of said multiple blocks, said size indication determined by said compression rate determiner for said block to said pixel value buffer in said buffer memory in connection with a preceding sequence of symbols preceding, according to said reading order of said pixel value buffer, said sequence of symbols obtained by variable length encoding said block by said variable length encoder.

11. The device according to claim 10, wherein said indication arranger is configured to write, for each block of said multiple blocks, said size indication determined by said compression rate determiner for said block to said pixel value buffer in said buffer memory directly following or directly preceding, according to said reading order of said pixel value buffer, said preceding sequence of symbols.

12. The device according to claim 10, wherein said sequence arranger is configured to arrange a sequence of symbols corresponding to an uncompressed version of a first block in said tile as a first sequence of symbols in said pixel value buffer in said buffer memory followed by said multiple sequences of symbols according to said reading order of said pixel value buffer.

13. The device according to claim 10, wherein:
said variable length encoder is configured to variable length encode a first block of pixels in said tile to form a sequence of symbols as encoded representations of pixel values of said pixels in said first block in said tile;
said compression rate determiner is configured to determine a size indication representative of a compression ratio of said sequence of symbols obtained by variable length encoding said first block in said tile by said variable length encoder;
said sequence arranger is configured to arrange said sequence of symbols, obtained by variable length encoding said first block in said tile by said variable length encoder, as a first sequence of symbols in said pixel value buffer in said buffer memory followed by said multiple sequences of symbols according to said reading order of said pixel value buffer; and
said indication arranger is configured to store said size indication determined by said compression rate determiner for said first block in said tile in a memory location different from said pixel value buffer in said buffer memory.

14. The device according to claim 10, wherein said sequence arranger is configured to write said combined sequences to said pixel value buffer in said buffer memory in a reversed order selected from the group of a reversed Morton order, a reversed Hilbert order and an order that is opposite to said reading order.

15. The device according to claim 9, wherein each set comprises a predefined multiple number of respective blocks of said multiple blocks and said indication arranger is configured to write, for each set, said size indication determined by said compression rate determiner for said set to said pixel value buffer in said buffer memory in connection with a preceding combined sequence of a preceding tile preceding, according to said reading order of said pixel value buffer, said tile.

16. The device according to claim 15, wherein said indication arranger is configured to write, for each set, said size indication determined by said compression rate determiner for said set to said pixel value buffer in said buffer memory directly following or directly preceding, according to said reading order of said pixel value buffer, said preceding combined sequence of said preceding tile.

17. A device for encoding a pixel value buffer comprising multiple tiles of pixels each having a respective pixel value, said device comprising:
a variable length encoder configured to variable length encode, for each tile of at least a portion of said multiple tiles, multiple blocks of pixels constituting respective subsets of said tile to form multiple sequences of symbols as encoded representations of pixel values of said pixels in said multiple blocks;
a compression rate determiner configured to determine, for each tile of said at least a portion of said multiple tiles and for each set of multiple blocks in said tile, a size indication representative of a compression ratio a combined sequence corresponding to multiple sequences of symbols obtained by variable length encoding said multiple blocks of said set by said variable length encoder;
a sequence writer configured to write said combined sequences of said at least a portion of said multiple tiles to said pixel value buffer in a buffer memory according to a reversed order selected from the group consisting of a reversed Morton order, a reversed Hilbert order and an order that is opposite to a reading order of said pixel value buffer; and
an indication writer configured to write, for each tile of said at least a portion of said multiple tiles, said size indications determined by said compression rate determiner for said tile to said pixel value buffer in said buffer memory in connection with preceding combined sequences of a preceding tile preceding, according to said reading order of said pixel value buffer, said tile.

18. A graphical processing unit comprising a device according to claim 9.

19. A user terminal comprising a graphical processing unit according to claim 18 connected to a buffer memory via a data bus.

20. A method of encoding a pixel value buffer comprising multiple tiles of pixels each having a respective pixel value, said method comprising:
variable length encoding, for each tile of at least a portion of said multiple tiles, multiple blocks of pixels constituting respective subsets of said tile to form multiple sequences of symbols as encoded representations of pixel values of said pixels in said multiple blocks;
determining, for each tile of said at least a portion of said multiple tiles and for each set of multiple blocks in said tile, a size indication representative of a compression ratio a combined sequence corresponding to multiple sequences of symbols obtained by variable length encoding said multiple blocks of said set;
writing said combined sequences of said at least a portion of said multiple tiles to said pixel value buffer in a buffer memory according to a reversed order selected from the group consisting of a reversed Morton order, a reversed Hilbert order and an order that is opposite to a reading order of said pixel value buffer; and
writing, for each tile of said at least a portion of said multiple tiles, said size indications determined for said tile to said pixel value buffer in said buffer memory in connection with preceding combined sequences of a preceding tile preceding, according to said reading order of said pixel value buffer, said tile.

* * * * *

UNITED STATES PATENT AND TRADEMARK OFFICE
CERTIFICATE OF CORRECTION

PATENT NO. : 9,286,698 B2  Page 1 of 1
APPLICATION NO. : 13/993842
DATED : March 15, 2016
INVENTOR(S) : Ström et al.

It is certified that error appears in the above-identified patent and that said Letters Patent is hereby corrected as shown below:

Title page, item (75), under "Inventors", in Column 1, Line 2, delete "Arsta" and insert
-- Årsta --, therefor.

Specification

In Column 22, Line 8, delete "110" and insert -- I/O --, therefor.

Signed and Sealed this
Nineteenth Day of July, 2016

Michelle K. Lee
*Director of the United States Patent and Trademark Office*